(No Model.)

C. SCHROEDER.
HARNESS PAD.

No. 489,270. Patented Jan. 3, 1893.

Witnesses
Geo. W. Lowry.
John E. Wiles.

Inventor.
Conrad Schroeder
By H. G. Underwood
Attorney

UNITED STATES PATENT OFFICE.

CONRAD SCHROEDER, OF MILWAUKEE, WISCONSIN.

HARNESS-PAD.

SPECIFICATION forming part of Letters Patent No. 489,270, dated January 3, 1893.

Application filed January 30, 1892. Serial No. 419,795. (No model.)

*To all whom it may concern:*

Be it known that I, CONRAD SCHROEDER, a citizen of the United States, and a resident of Milwaukee, in the county of Milwaukee, and in the State of Wisconsin, have invented certain new and useful Improvements in Harness-Pads; and I do hereby declare that the following is a full, clear, and exact description thereof.

My invention relates to certain new and useful improvements in harness pads, and consists in the matters hereinafter described and pointed out in the appended claim.

The object of my said invention is to provide an improved pad for harness, having a series of elastic bearing points, and intermediate air spaces, the arrangement being such that a free circulation of air is permitted between the portion of the harness to which the pad is applied, and the body of the horse, so as to keep the skin cool and prevent chafing.

The several features of my improvement will be more fully hereinafter described with reference to the accompanying drawings, in which:—

Figure 1:
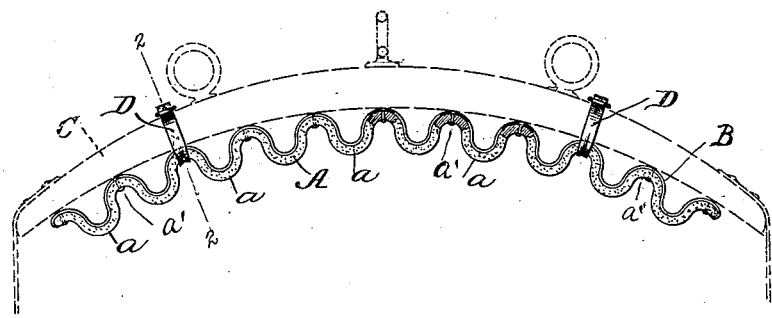
Figure 2:
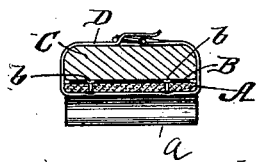
Figure 3:
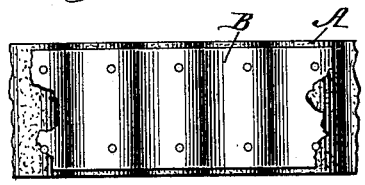

Figure 1. is a front elevation of a harness pad constructed in accordance with my invention and illustrating in dotted lines, the portion of the harness to which it is secured. Fig. 2. is a cross section of the same taken on line 2—2, of Fig. 1. Fig. 3. is a plan view of a portion of the pad.

A represents the pad, preferably formed from some suitable elastic or yielding material, such as felt, so shaped as to have a series of bearing points $a$, $a$, adapted to come against the skin of the horse, and to have a series of intermediate air spaces or passages, $a'$, $a'$. This pad may be shaped, in any suitable way, with a series of corrugations, and, in order to retain this pad in shape, I provide a rigid or inflexible strengthening strip, B, of corresponding shape to that of the pad A, and secure the strip B to the upper surface of the pad A, as by means of suitable rivets, $b$ $b$.

In the drawings, I have illustrated my improved pad as being applied to the under side of a harness saddle, C, and secured thereto by suitable straps or attaching devices D.

By the use of my improved form of harness pad, a very soft and elastic cushion is formed upon the inner surface of the harness, and by the arrangement of the series of elastic bearing points with the intermediate air passages a free circulation of air is permitted between the harness and the body of the horse, so that the horse's skin is kept cool and comfortable and prevented from chafing. This form of harness pad, therefore, effectually prevents the formation of sores upon the horse's body due to the chafing of the harness.

My improved pad may be readily applied to any desired form of harness, and may obviously be applied to any portion of the harness where it is desirable to provide a pad.

Having thus described my invention, what I claim as new and desire to secure by Letters Patent of the United States is:—

A harness-pad comprising a strip of elastic or yielding material corrugated so as to form a series of bearing points and a series of intermediate air passages or spaces, the said corrugations being everywhere and always free from contact with each other, in combination with a similarly corrugated rigid or inflexible strengthening strip, secured to the upper surface of the described flexible strip, substantially as described.

In testimony that I claim the foregoing I have hereunto set my hand, at Milwaukee, in the county of Milwaukee and State of Wisconsin, in the presence of two witnesses.

CONRAD SCHROEDER.

Witnesses:
H. G. UNDERWOOD,
JOHN E. WILES.